United States Patent
Seng

[19]

[11] Patent Number: 5,880,844
[45] Date of Patent: Mar. 9, 1999

[54] HYBRID CONFOCAL MICROSCOPY

[75] Inventor: Toh Peng Seng, Singapore, Singapore

[73] Assignee: Hewlett-Packard Company, Palo Alto, Calif.

[21] Appl. No.: 833,732

[22] Filed: Apr. 9, 1997

[51] Int. Cl.$^6$ .......................... G01B 11/24; G01B 11/28
[52] U.S. Cl. .......................... 356/376; 356/379
[58] Field of Search .......................... 356/375, 376, 356/379; 250/201.3, 559.22, 559.27

[56] References Cited

U.S. PATENT DOCUMENTS 4,743,771  5/1988  Sacks et al. .......................... 356/376
4,891,772  1/1990  Case et al. .
4,965,441  10/1990  Picard .

Primary Examiner—Robert Kim
Assistant Examiner—Amanda Merlino

[57] ABSTRACT

A method and apparatus are provided that measure object height and volume using a combination of and optical means and image processing techniques. The method includes multiple imaging paths with different object distance viewing the same field of view of the object. Image processing techniques are used to determine the degrees-of-focus of features of the images captured from the different imaging paths. Height of the features of the object is determined by the difference in the degrees-of-focus on different images. The object volume is calculated from the height of its features.

6 Claims, 6 Drawing Sheets

HYBRID CONFOCAL MICROSCOPY

BACKGROUND OF THE INVENTION

The present invention generally relates to a method and an apparatus for the measurement of object height and volume using a combination of optical means and image processing techniques.

There are many applications that require the measurement of height and volume using non-contact means. For example, a first step in a surface-mount printed circuit board assembly process is the printing of solder paste onto the solder pads. In this case, the amount of solder paste deposition onto the solder pad is crucial to the integrity of the assembled printed circuit board. A wrong amount of solder forms a poor solder joint. Excessive solder paste causes bridging between adjacent pads. Less solder paste causes poor contact. In another example, the wire bonding process connects a wire from the bond pad of a semiconductor die to a lead of a lead frame. This process requires the measurement of the wire loop height and the ball height.

It can be observed that most of the existing on-line methods of measuring the height and volume of an object, such as solder paste, rely on sampling of several points on the deposition. Sampling measurement does not provide sufficient data and information for effective process control. On the other hand, detailed measurement which covers the entire solder paste deposition is time consuming which can only be performed off-line. In the case of measuring the wire loop and ball height in the wire bonding application, manual techniques relying on focusing are commonly used. This technique is difficult to automate and is slow in nature.

Laser structured light and confocal scanning laser microscopy approaches are two common methods for the measurement of object height and volume. The laser structured light approach makes use of a laser line projector to project a finely focused light strip over the solder paste. The displacement of the light strip from its original axis is observed. Using a triangulation principle, the displacement of the light strip is used to calculate the height of an object, for example, the solder paste. U.S. Pat. No. 4,891,772, issued Apr. 15, 1987, discloses point and line range sensors using the principle of laser structured light.

U.S. Pat. No. 4,965,441, issued Feb. 26, 1989, discloses a method of scanning confocal light-optical microscopy. This method measures the focusing of laser beams to determine the height of an object. The entire solder paste deposition can be measured using the scanning confocal light-optical microscopy method. However, this method is time consuming and can only be applied off-line.

SUMMARY OF THE INVENTION

According to the present invention, a method is provided that uses multiple imaging paths, with each path set to a different image distance, to acquire multiple images of the object through a common field of view. An image sensor is attached to each of the imaging paths to acquire images of the object. The multiple imaging paths are set to a different image distance and, hence, the corresponding object distance is different from one another. Images appearing on the image sensors attached at different imaging paths are focused at different heights in the object space. A corresponding number of height planes are created in the object space by the multiple imaging paths. Object features having different heights will appear with different degrees-of-focus at a particular imaging path. Object features located within the preset objective distance of a particular imaging path appear focused on that image sensor.

According to the present invention, the height of an object feature is computed according to the degree-of-focus of the images acquired by the different imaging paths. Image processing techniques are used to measure the degree-of-focus of an image acquired by a frame grabber from the image sensors of the multiple imaging paths. The variable degree-of-focus gathered from the multiple image paths and sensors are used to compute the height and, hence, the volume of the features of the object.

The present invention also provides an apparatus having optical means, image processing means and X-Y scanning means. The optical means includes multiple imaging paths created by the use of multiple beam splitters with a common objective lens. The objective lens is positioned in between the object and the multiple beam splitters. The multiple beam splitter splits the image into multiple paths. Each of the imaging paths is attached with an image sensor, such as a CCD sensor. The multiple image sensors of the optical means are connected to the image processing means in which frame grabbers are used to digitize the images for image processing and analysis. Image processing techniques are applied to the images to identify the features of interest, determine the degree-of-focus on each of the images, compute the height information and make a decision with respect to acceptance or rejection according to a pre-stored criterion. The X-Y scanning means is used in conjunction with the optical and image processing means to cover a large area. The X-Y scanning means either moves the optical means of the present invention or the object so that an area larger than a single field-of-view is covered.

These and other advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
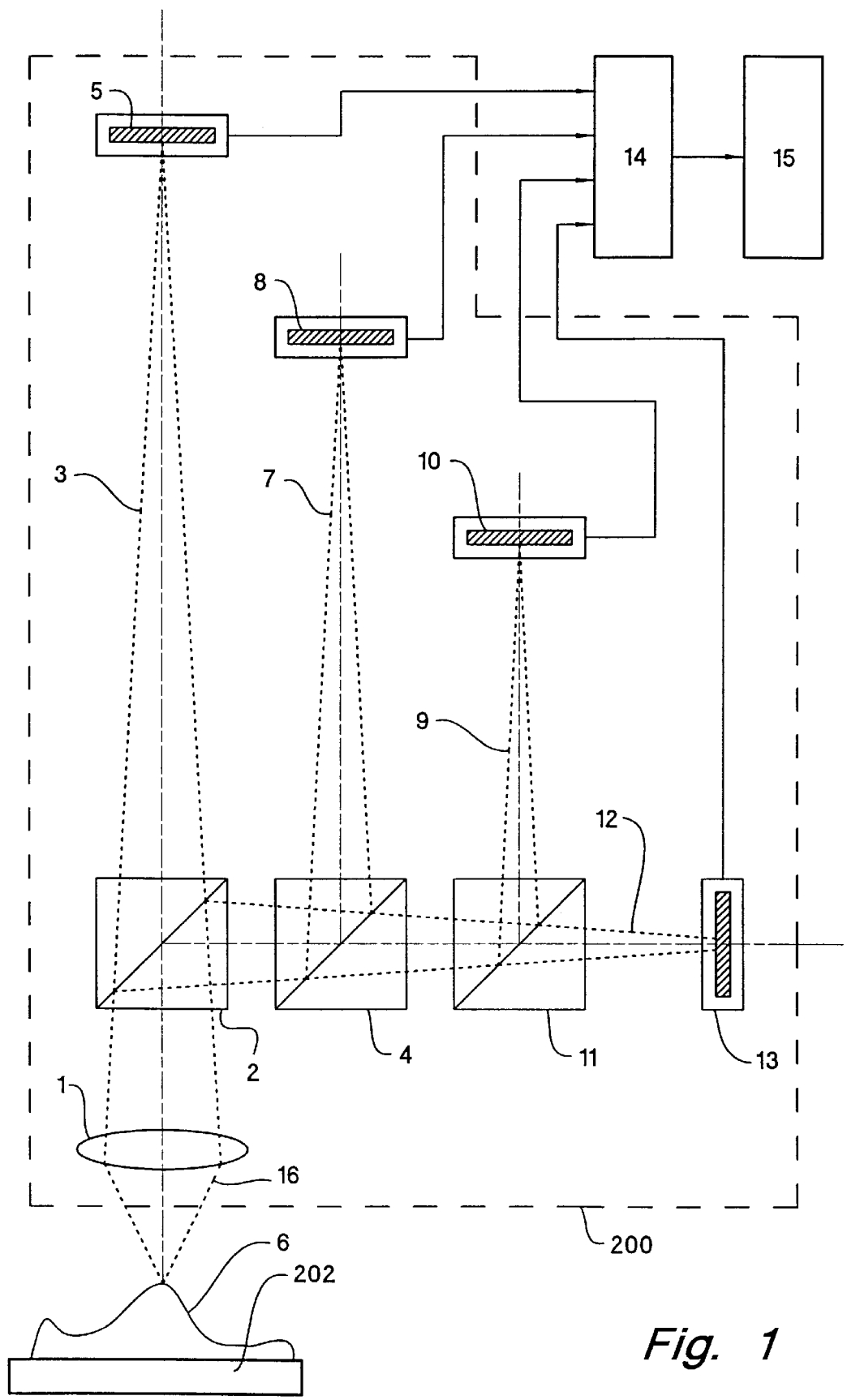
FIG. 1 illustrates a block diagram of an embodiment of the present invention.

A specific embodiment of the present invention consists of an objective lens 1 and multiple beam splitters 2, 4 and 11 to form multiple imaging paths 3, 7, 9 and 12. Each of the imaging paths 3, 7, 9 and 12 consists of an image sensor 5, 8, 10 and 13, respectively. The image sensors 5, 8, 10 and 13 are connected to a frame grabber 14 so that the respective images can be read and processed by an image processor, such as a host computer 15. Each of the imaging paths 3, 7, 9 and 12 is predetermined to focus at a different object distance on a common field of view 16 containing the object 6. A corresponding number of height planes 31, 32, 33 and 34 are created by the multiple imaging paths 3, 7, 9 and 12 in the object space. The objective lens 1, the multiple beam splitters 2, 4 and 11, and the multiple image sensors 5, 8, 10 and 13 may be enclosed in a light shield casing, collectively known as the optical system 200.

Images 40, 41, 42 and 43 acquired from the image sensors 5, 8, 10 and 13 attached to the multiple imaging paths 3, 7, 9 and 12 are digitized by the frame grabber 14 and communicated to the host computer 15. The images 40, 41, 42 and 43 are subjected to image intensity correction as each of the images has different intensity due to the effect of the beam splitters 2, 4 and 11. Each beam splitter 2, 4 and 11 splits an incoming image into two paths and, hence, reduces the intensity of the split images. The image intensity correction method equalizes the mean intensity of the different images to a nominal value. Noise removal techniques, such as the threshold-intensity-transform method, is applied to remove the background noise. Object features 45 are then produced after the images have been corrected and noise removed.

The object 6 is placed on an X-Y scanning mechanism 202 such that it can be moved to position different parts of the object 6 under the objective lens 1 of the optical system 200. Alternatively, the X-Y scanning mechanism 202 can also be attached to the optical system 200 while the object 6 remains stationary. The optical system 200 is then moved by the X-Y scanning mechanism 202 to scan the object 6.

The degree-of-focus of an object feature 45 is computed for all of the images 40,41,42 and 43 acquired from the multiple imaging paths 3, 7, 9 and 12. An object feature 45 appears focused on one of the images 40, 41, 42 and 43. The height of the object feature 45 is classified according to the height plane of the imaging path that it is focused. This procedure is applied to all of the object features and hence the heights of all features are computed.

An exemplary design of the optical system used for the present invention is disclosed. The objective lens 1 is designed for finite conjugate imaging and is properly corrected for distortion at a selected band of wavelength. A thin lens model is used to model the objective lens 1.

The basic lens formula is given by:

$$\frac{1}{u_1} + \frac{1}{v_1} = \frac{1}{f} \qquad (1)$$

where $u_1$ is the object distance 31 of the first imaging path 3; and $v_1$ is the corresponding image distance; f is the effective focal length of the objective lens 1.

Rearranging the equation above gives:

$$v_1 = \frac{fu_1}{u_1 - f}, \qquad (2)$$

The second imaging path 7 is focused at an object distance $u_1-\delta,32$; $\delta$ is the height resolution and $v_2$ is the corresponding image distance of the second imaging path 7 as follows:

$$v_2 = \frac{f(u_1 - \delta)}{u_1 - \delta - f} \qquad (3)$$

For the $n^{th}$ imaging path, the object distance is $u_1-(n-1)\delta$; and $n_v$ is the image distance of the $n_{th}$ imaging path.

$$v_n = \frac{f[u_1 - (n-1)\delta]}{u_1 - (n-1)\delta - f} \qquad (4)$$

Using equation 4, the image sensors for the respective image paths are positioned at $v_n$. Suitable compensation must also be applied to the image distance due to the different length of media. Some of the imaging paths consist of more glass media than air.

Let $I_1, I_2, I_3, \ldots I_n$ be the images 40, 41, 42 and 43 acquired by the sensors 5, 8, 10 and 13 located at the different imaging paths 3, 7, 9 and 12, respectively. For image features whose heights are between $u_1+\delta/2$ and $u_1-\delta/2$, they appear focused on image $I_1$. Similarly, image features with heights between $u_1-(n-1)\delta+\delta/2$ and $u_1-(n-1)\delta-\delta/2$ appear focused on image $I_n$.

Figure 2:
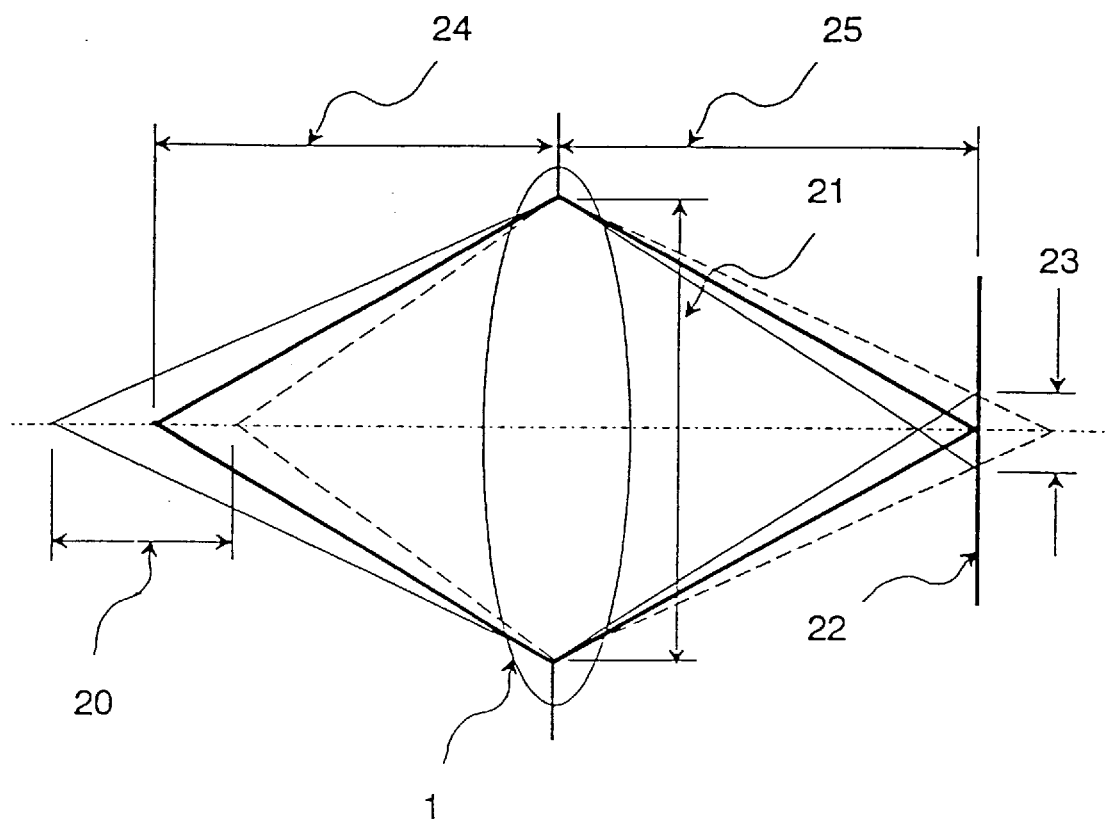
FIG. 2 illustrates a schematic diagram of the depth of the field effect associated with an optical system using a thin lens model.
Figure 3:
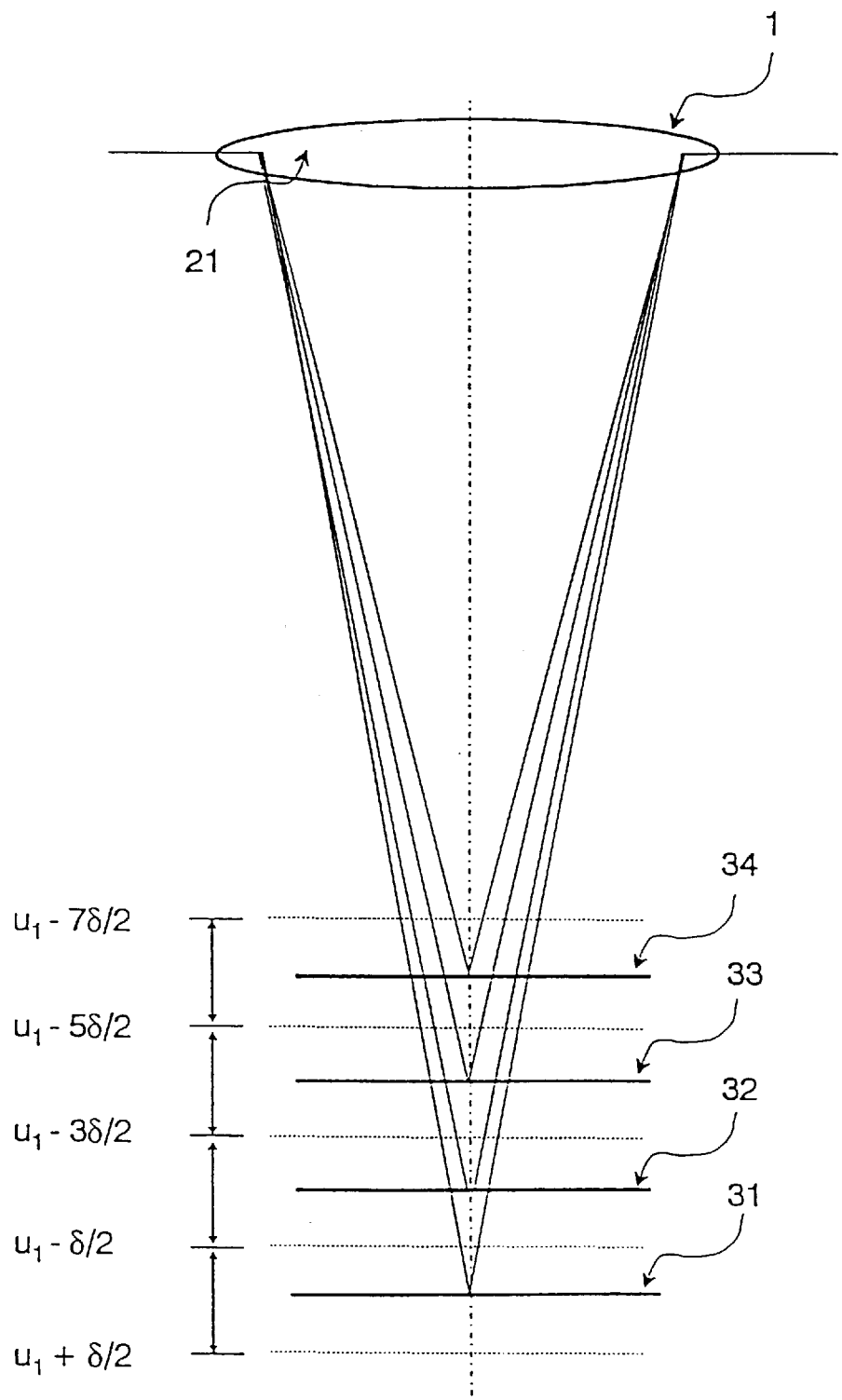
FIG. 3 illustrates a diagram of multiple imaging paths of the optical system focused at different height planes in the object space.

The resolution of the height measurable by the present invention is related to the depth-of-field of the optical system. The depth-of-field 20,D, of an optical system is given by:

$$D(u) = \frac{2uafc(u - f)}{a^2f^2 - c^2(u - f)^2} \qquad (5)$$

where u=object distance 24, a=diameter of aperture 21, f=effective focal length, and c=circle of least confusion 23. FIG. 2 illustrates the depth-of-field effect of an optical system involving a thin lens model. The circle of least confusion 23, c, is dictated by the pixel size of the image sensor 5, 8, 10 and 13. The desired depth-of-field 20, D, of the optical system can be designed by varying the diameter of the aperture 21, a, and the effective focal length, f, of the objective lens 1.

The object features contained in the image consisting of the object are extracted by various image processing techniques. For those skilled in the art, image processing techniques such as region segmentation, edge detection and labeling can be used for feature extraction. An example of using the threshold-intensity-transform method is described hereinafter. The intensity of a pixel in the transformed image, $I_{out}$, is set to zero if its intensity in the original image $I_{in}$, is less than the threshold, T; while pixel intensities larger than the threshold are preserved in the transformed image. Mathematically, the transformed image $I_{out}$ which consists of the extracted features are expressed as follows:

$I_{out}=0$; if $I_{in}<T$ $I_{out}=I_{in}$; if $I_{in} \geq T$

Figure 4:
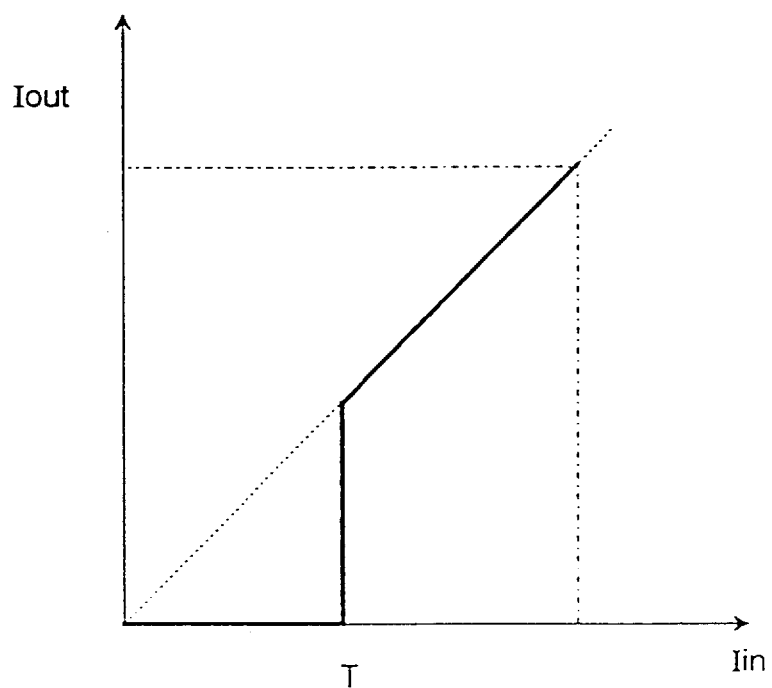
FIG. 4 illustrates a graph of feature extraction using a threshold-intensity-transform method.

The threshold-intensity-transform method is illustrated in FIG. 4. The threshold T is partially determined by the background noise level of the image and can be manually selected for a particular imaging system. In the threshold-intensity-transform image, pixels with zero intensity are treated as background while non-zero intensity pixels forming clusters are regarded as object features 45.

An object of the present invention is to determine the best focal plane of a particular object feature 45 and, hence, determine its height. For those skilled in the art of image processing, there are many ways of determining whether an object feature is focused on the image plane. References such as Eric Krotkov, "Focusing" in *International Journal of Computer Visions*, Vol. 1, 1987, pages 223, 237 and J. F. Schlag et al., "Implementation of Automatic Focusing Algorithms of a Computer Vision System with Camera Control," *Carnegie Mellon University Technical Report*, #CMU-R1-TR-83-14, 1983, give good accounts of the image processing techniques for focus determination.

An exemplary technique of determining the degree-of-focus of object features is disclosed hereinafter. For the sake of clarity, the solder paste is used as the object for illustration purposes. If an object feature of the object 6 is focused, the area of the object feature 45 is smallest and its intensity energy is highest. The area of the object feature 45 is computed by summing the total number of pixels that have non-zero intensity forming a cluster. The total intensity energy of the object feature 45 is calculated by summing all of the intensity of pixels that belong to the object feature. As there are multiple imaging paths 3, 7, 9 and 12 forming multiple images 40, 41, 42 and 43, these two parameters, i.e. area and intensity energy, are computed for all of the images $I_1, I_2, I_3, \ldots I_n$ and 40, 41, 42 and 43. An object feature 45 is considered focused on image $I_n$ when its area is the smallest and its intensity energy is the highest on the $n^{th}$ image plane.

The computation of the area and intensity energy of an object feature 45, labeled k, can be formulated as follows:

$$A(k,n) = \sum_{x,y \in k} \begin{cases} 1 & \text{if } I_n(x,y) \geq T \\ 0 & \text{if } I_n(x,y) < T \end{cases} \quad (6)$$

$$S(k,n) = \sum_{x,y \in k} I_n(x,y) \quad (7)$$

where A(k,n) is the area of an object feature k in image $I_n$; and S (k,n) is the intensity energy of an object feature k in the image $I_n$.

(8) Best-focal-plane (k)=min {A(k,n)} and max {S(,n)} for all n images.

Figure 6:
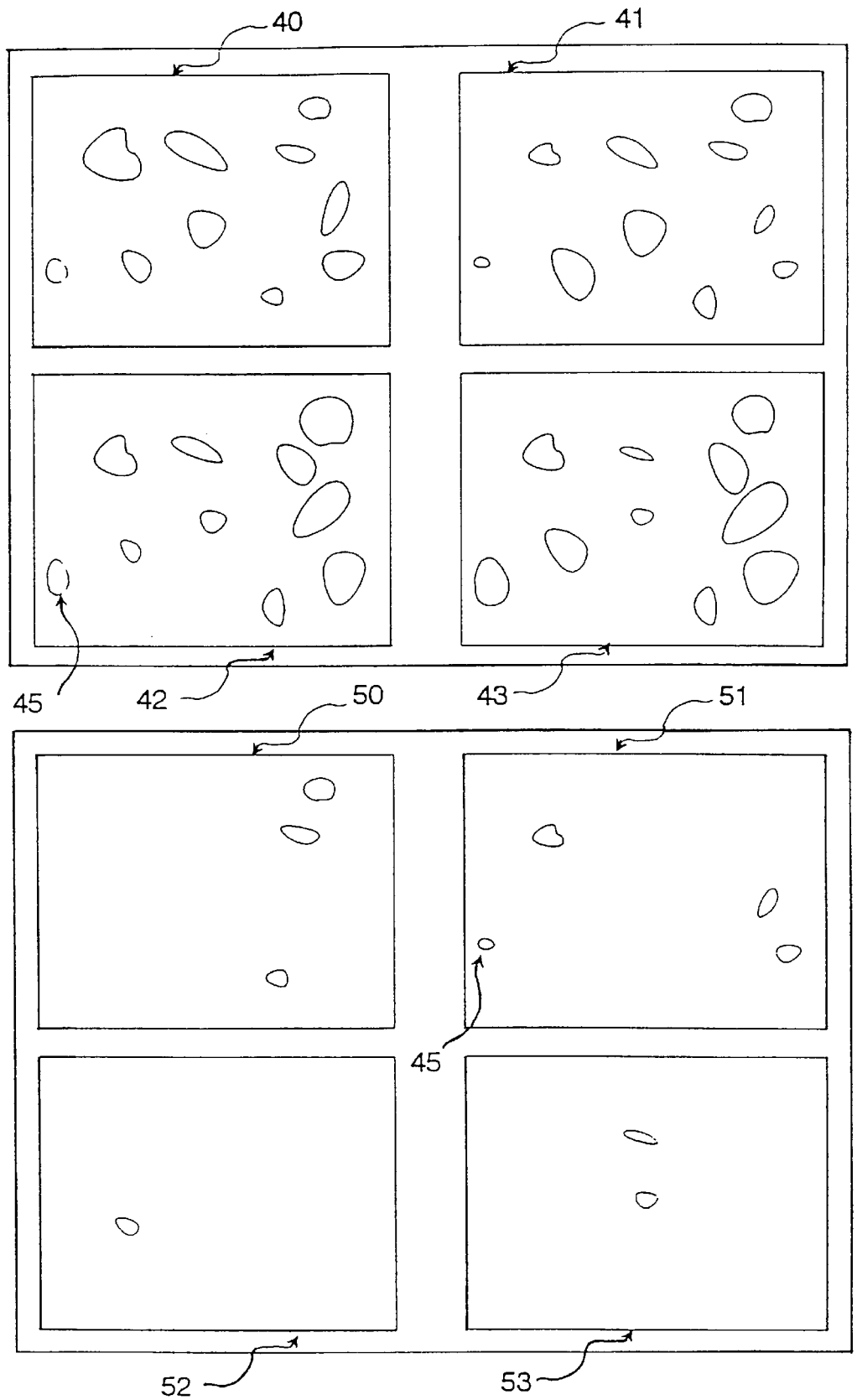
FIGS. 6A and 6B illustrate an example of the determination of the best-focal-place for an object feature.

FIGS. 6A and 6B illustrate an example for the determination of the best-focal-plane of an object feature. In this particular example, four images 40, 41, 42 and 43 are acquired from the respective sensors of the four imaging paths. The object feature 45 is found to be focused on image 13 using the above equation (8). The height of this object feature 45 is, therefore, approximated to $u_3$.

Figure 5:
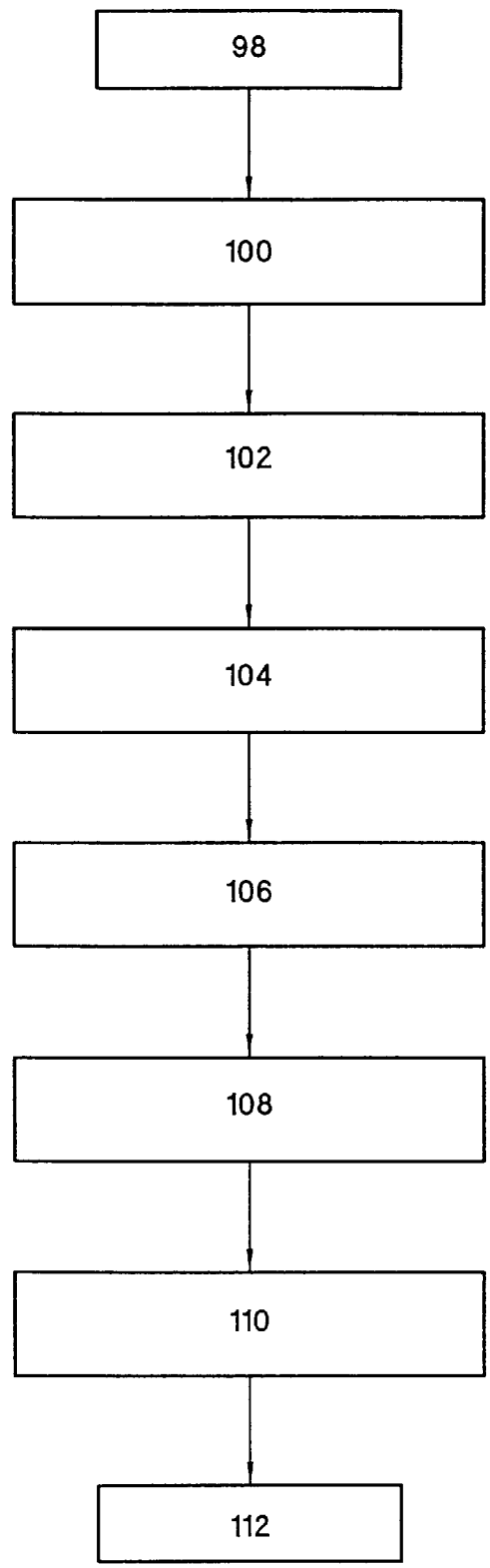
FIG. 5 illustrates a flowchart of an operational procedure in an embodiment of the present invention.

The overall procedure for measuring the height and calculating the volume of object features is illustrated in FIG. 5. Step 98 is the beginning of the procedure. At step 100, images are acquired into the host processor 15 memory. At step 102, pre-processing, such as noise removal algorithms and intensity normalization, are applied. One such algorithm that has been previously mentioned earlier is the threshold-intensity-transform method. At step 104, feature extraction algorithms, such as edge detection, is applied to detect the edges of object features 45. At step 106, the degree-of-focus of the object features 45 are computed for all of the different images 40, 41, 42 and 43 acquired from the different imaging paths 3, 7, 9 and 12. At step 108, the degree-of-focus values from the different images 40, 41, 42 and 43 are used to compute the height of each of the features 45. At step 110, volume of the object 6 can be computed.

The above procedure can be repeated for different areas of the object 6 when the object 6 is larger than the field of view of the optical system 200. Alternatively, the process may end as illustrated at step 112. If repetition of the procedure is required, either the optical system 200 or the object 6 can be moved by the X-Y scanning mechanism 202. Hence, the height of a large area of the object 6 can be measured using the present invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for measuring the height and volume of an object using multiple imaging paths with respective multiple sensors, the method comprising the steps of:

setting each of the multiple imaging path to a different image distance;

acquiring images of the object through a common field of view;

imaging a single object feature on the object onto each of the multiple sensors with the different image distances such that the each of the multiple sensors have a different degree-of-focus;

measuring by image processing techniques the degree-of-focus of the images acquired along the multiple imaging paths; and computing the height of the object according to its degree-of-focus on the multiple imaging paths.

2. The method as claimed in claim 1 further comprising the step of generating relative motion between the object and the multiple sensors for measuring the height of different parts of the object.

3. An apparatus for measuring height and volume of objects, comprising:

a common objective lens for acquiring images of an object;

a plurality of beam splitters that are cascaded to receive the images of the object from the common objective lens and that split the images of the object along multiple imaging paths;

image sensors for sensing the images along the multiple imaging paths; and an image processor for processing the sensed images to determine the height of the feature.

4. The apparatus as claimed in claim 3 wherein each of the image sensors is placed at each of the multiple imaging paths and each of the image sensors is set to differing imaging distances from one another.

5. The apparatus as claimed in claim 3 wherein the plurality of beam splitters, the common objective lens and the image sensors form an optical system.

6. The apparatus as claimed in claim 5, further comprising:

an X-Y scanning mechanism for generating a relative motion between the optical system and the object so that different parts of the object can be measured.

* * * * *